Aug. 6, 1929.  S. R. BERGMAN  1,723,912

DYNAMO ELECTRIC MACHINE

Filed Feb. 15, 1928

Inventor
Sven R. Bergman,
by Charles E. Tullar
His Attorney.

Patented Aug. 6, 1929.

1,723,912

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

Application filed February 15, 1928. Serial No. 254,566.

My invention relates to dynamo electric machines and has for its object a novel construction of the stationary member of such a machine, whereby the magnetic material of the member is used to better advantage than was heretofore possible, and furthermore the member may be made out of punchings without any waste.

Figure 1:
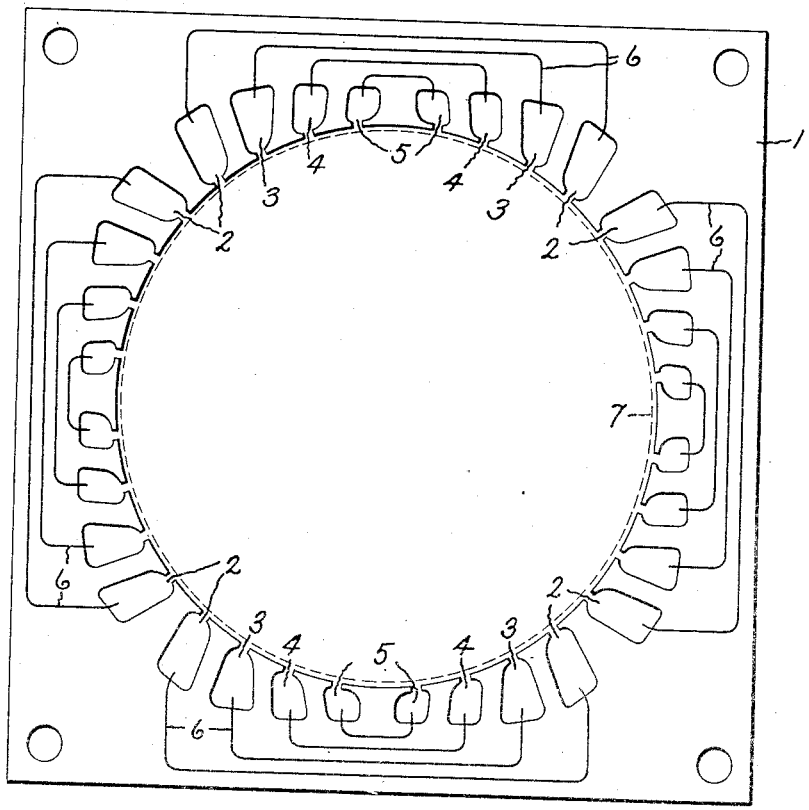
Figure 2:
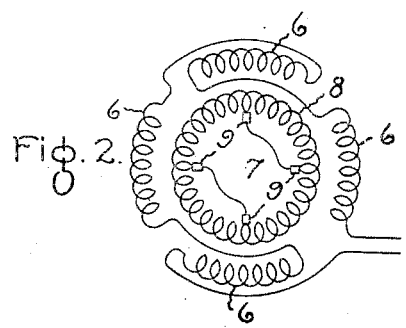

The various features of novelty which characterize my invention are pointed out with particularity in the claims annexed to and forming a part of this specification. For a better understanding of my invention, reference may be had to the following description taken in connection with the accompanying drawing, in which Fig. 1 is a view of a dynamo electric machine embodying my invention, and Fig. 2 is a diagram of connections.

Although my invention is applicable to dynamo electric machines generally, it is particularly applicable to single phase alternating current motors and I have shown it applied to a single phase repulsion motor in the accompanying drawing. The stationary member of the motor illustrated comprises square laminations 1 having slots 2, 3, 4 and 5 in the inner periphery thereof. The slots 2 at the corners of the laminations are much deeper than those opposite the sides of the laminations. A winding 6 is non-uniformly distributed and substantially fills all the slots, the number of turns of the winding per slot varying approximately sinusoidally around the periphery. The purpose of this, is to obtain a sine-wave shape of flux for each pole. The slots opposite each side of the square form one pole, when my arrangement is used in a 4-pole motor, and the axes of the slots forming such a pole are substantially parallel.

The rotatable member 7 may be of any well known construction. In Fig. 2 of the drawing, I have shown one form of circuit arrangement of the windings. The circuit arrangement is that of a single phase repulsion motor. The winding 6 of the stationary member is connected to a source of single phase alternating current, the windings of all the poles being connected in series. The winding 8 of the rotatable member is connected to a commutator on which brushes 9 bear. The brushes of opposite polarity are connected together so as to short-circuit the winding 8.

In order to obtain an approximately sinusoidal shape of flux for each pole, the number of turns in the winding 6 for each pole are arranged in about the ratio of 40 : 36 : 26 : 10 : 10 : 26 : 36 : 40. The largest number of turns are placed in slots 2 and the smallest number of turns in slots 5, the intermediate number of turns being placed in slots 3 and 4. With this arrangement of the winding, the center of the poles coincides with the center of the sides of the square. By utilizing the ordinarily wasted corners of a square punching for the large slots, the flux path back of the slots is not restricted. Since in an alternating current motor, the flux revolves, the flux density in the stator should be the same at all points. It will be noted that with my construction the depth of the stator iron back of the slots is substantially constant and consequently the flux density in the stator is substantially contant.

With this arrangement, a great saving in material is accomplished due to the fact that the whole square is punched out from a sheet without waste. By making the slots with nearly parallel axes, the slots are made convenient for machine winding, thus saving cost, and also obtaining a greater average space factor, since there will be no tendency for the winding to pile up in any portion of the slot.

What I claim as new and desire to secure by Letters Patent of the United States is:

1. In a dynamo electric machine, a stationary magnetic structure comprising substantially square laminations having slots on the inner periphery thereof, said slots at the corners of said laminations being deeper than those opposite the sides of said laminations, and a winding distributed in said slots and substantially filling said slots.

2. In a dynamo electric machine, a stationary magnetic structure comprising substantially square laminations having slots on the inner periphery thereof, said slots at the corners of said laminations being deeper than those opposite the sides of said laminations, and a winding distributed in said slots and substantially filling said slots, the number of turns of the winding in each slot varying approximately sinusoidally around the periphery of said laminations.

3. In a dynamo electric machine, a stationary magnetic structure comprising substantially square laminations having slots on the inner periphery thereof, said slots at the corners of said laminations being deeper than those opposite the sides of said laminations, and a winding distributed in said slots and substantially filling said slots, the slots opposite each side of the square containing the windings of a single pole.

4. In a dynamo electric machine, a stationary magnetic structure comprising substantially square laminations having slots on the inner periphery thereof, said slots at the corners of said laminations being deeper than those opposite the sides of said laminations, and a winding distributed in said slots and substantially filling said slots, the number of turns of the winding in each slot varying approximately sinusoidally around the periphery of said laminations, the slots opposite each side of the square containing the windings of a single pole.

In witness whereof, I have hereunto set my hand this 11th day of February, 1928.

SVEN R. BERGMAN.